July 3, 1951 W. H. HARRISON 2,558,848
MIRROR AND METHOD OF MAKING SAME
Filed Oct. 15, 1948

WILLIAM H. HARRISON,
INVENTOR.

BY
Robert O. Fulwider
ATTORNEY

Patented July 3, 1951

2,558,848

UNITED STATES PATENT OFFICE 2,558,848

MIRROR AND METHOD OF MAKING SAME

William H. Harrison, Los Angeles, Calif.

Application October 15, 1948, Serial No. 54,745

7 Claims. (Cl. 88—105)

My invention relates generally to mirrors, and more particularly to mirrors of the type used by women in the application of cosmetics, etc.

While it is well known that mirrors may be made which reflect an image that is greatly distorted or otherwise unflattering, it may be shown that a mirror cannot reflect an image that is better or more flattering than the object itself. However, a person using a hand-held mirror observes a reflected image of himself, that is apparently two to three feet away from his eyes. At this distance, minor blemishes and irregularities of the skin are quite visible, and when a person is looking at his image with a very critical attitude, these blemishes and imperfections are quite obvious.

On the other hand, others usually do not observe a person with such a critical attitude, nor is he generally observed at such close range. Instead, the average viewing distance of one person looking at another is probably about five or six feet, and consequently, close scrutiny in a hand mirror may convince a person that he is much more unattractive than others find him. Although an optically perfect mirror will reflect a correct and undistorted image, the optical image is not the same as the apparent image which others see. It is possible, though, to construct a mirror that produces a softened or diffused effect, comparable to the image seen by others a greater distance away.

I have found that by constructing a mirror as hereinafter described, I am able to produce a mirror which apparently flatters those who observe themselves in it, while actually reflecting only a very slightly diffused image in which any irregularities and blemishes are softened so that they appear to the self-observer as they normally appear to others. In effect, such a mirror may be said to decrease the resolving power of the observer.

It is therefore a major object of my invention to provide a mirror and a method of making the same having the so-called flattering characteristics mentioned above.

Another object of my invention is to provide a mirror of this type that is used in exactly the same manner as the presently available harsh or non-flattering mirrors, and is generally indistinguishable therefrom except upon close observance.

It is a further object of my invention to provide such a mirror that may readily be mounted in or attached to a compact or similar article, or may be produced as a separate and independent mirror.

Still another object of my invention is to provide a mirror whose softness or diffusion may be varied and controlled by my novel method of manufacture.

It is a still further object of my invention to provide a mirror of this type that may be manufactured relatively inexpensively, having due consideration for the quality of mirror produced.

These and other objects and advantages of my invention will become apparent from the following description of preferred and modified forms thereof, and from the drawings illustrating those forms in which.

Figure 1:
Figure 1 is a perspective utility view showing my improved mirror in use.
Figure 2:
Figure 2 is a cross-sectional view of the preferred form of my mirror, the scale of the elements shown therein being greatly enlarged and somewhat distorted.

Referring now to the drawings and particularly to Figures 1 and 2 thereof, the numeral 10 indicates generally a mirror of the so-called back reflecting type. In such a mirror, a silvered or reflecting surface is placed upon the back of a transparent support, and light that is reflected passes through the support before reaching the reflector, and then passes again through the supporting material after having been reflected. This, it will be recognized, is the conventional type of mirror almost universally found in every day use.

However, the supporting member of my improved mirror is not formed of a single sheet of transparent material as is customary, but instead the support is laminated as indicated in Figure 2. As shown there, I provide an outer transparent sheet 11 of suitable material such as glass that is held by a thin layer of cement 12 to a second transparent layer or stratum 13. The opposite or uncemented surface of the transparent layer 13 is coated with a reflective layer 14 such as any of the well known silver or similar reflector layers. Since the reflecting layer 14 is often semi-transparent, it is customarily provided with an opaque backing such as a thin layer of paint 15. For convenience in description, the surface of each of the layers 11, 12, and 13 that faces a light ray passing through the outer layer 11, toward the reflecting layer 14 will hereinafter be referred to as the front or forward surface, while the opposite surface of these layers will be referred to as the back or rear surface.

It will thus be apparent that in order for light to be reflected from the mirror surface 14, the light must pass through the outer transparent layer 11, the cement 12, and the inner transparent layer 13 before it is reflected by the mirrored surface. Thereafter, it returns through the inner layer 13, the cement 12, and finally the outer transparent layer 11 before it again travels through the air. While the outer transparent layer 11 and the inner transparent layer 13 need not be ground optically flat, it will be seen that by reason of the double passage of the light through the layers, they should be substantially free of any important optical defects. For similar reasons, the transparent layers 11 and 13 and the cement 12 should be quite transparent and absorb very little of the light passing through them. Otherwise, the image will appear to be dark and the mirror will generally be less desirable for this reason.

To secure the diffusing or softening effect of my improved mirror, I use a cement 12 having an index of refraction which differs slightly from the index of refraction of the forward transparent layer 11. It will be realized that if the outer transparent layer 11 has the same index of refraction as the cement 12, the two layers will appear as a single layer regardless of the shape of their common boundary. This effect is known and widely used in the manufacture of optical instruments, since it is possible in this manner to remove the effect of any surface roughness or irregularity on a lens or refracting member so long as the index of refraction of the cement is equal to that of the refracting member. Consequently, any roughness of the rear surface of the forward transparent layer 11 will be undetectable if the cement 12 has the same index of refraction as the forward layer.

However, if the index of refraction of the cement 12 is different from that of the forward layer 11, roughness of the rear surface of the forward layer will be immediately detectable. From well known laws of physics, it will be seen that light passing through the forward layer 11 and the cement 12 will be scattered or refracted an amount depending both upon the roughness of the surface and upon the difference between the two indices of refraction. If the surface is only slightly roughened, as by lightly sandblasting or etching it, only a slight scattering or diffusion will result, while a greater roughness will produce a greater degree of diffusion. Similarly, the greater the difference between the index of refraction of the cement 12, and that of the outer or forward transparent layer 11, the greater the diffusion for a given roughness of the rear surface of the outer transparent layer.

It will thus be seen that there are two variables which may be used to control the amount of diffusion appearing in the finished mirror. However, it will generally be found easier to vary the roughness of the rear surface of the forward layer 11, than to vary the index of refraction of the cement 12, and consequently the former method is preferred. While either mechanical or chemical means may be used to provide this roughness, I find that etching the glass, as by hydrofluoric acid, is less satisfactory than the use of a sand blast, since the action of the acid on the glass will vary from one batch of glass to another, and sometimes between various pieces of glass from the same batch. Consequently, in the manufacture of my improved mirror, I sandblast the rear surface of the forward transparent layer 11, and then cement this surface to the forward surface of the rear transparent layer 13.

The forward and rear surfaces of the rear transparent layer 13 are smooth, and the surfaces are substantially parallel throughout the area of the mirror 10. A laminated structure is thus provided that is somewhat similar to the so-called "safety glass," but while the combined supporting layers 11 and 13 may be somewhat stronger than a single layer of the same size and thickness, the construction will not produce a true "safety glass."

The operation of my improved mirror will now be seen. When a person holds a mirror 10 as indicated in Figure 1, the light from the person's face will pass through the outer transparent layer 11 and into the cement 12, being diffused slightly in the process of passing from one layer to the other by the slight roughness of the rear surface of the layer 11. Thereafter, the slightly diffused light passes through the inner transparent layer 13 to the mirrored surface 14 where it is reflected, passing back through the inner transparent layer and cement 12, and then through the roughened surface of the outer transparent layer 11, where it is diffused slightly more. Thereafter, the diffused image passes through the outer transparent layer 11 and into the air, so that a diffused rather than a sharp, harsh image is seen. Consequently, while the mirror is held only twelve to eighteen inches away from the eyes of the observer, the apparent effect is the same as that secured by one's observing himself at a much greater distance. It will be realized that the resolving power of the human eye varies with the distance of the object observed, and the diffusing effect of my mirror corresponds to the normal loss of resolving power at a distance of approximately six feet, thus providing a more normal impression or image for a person using my improved mirror. While the mirror may seem to flatter the observer, it is actually showing him the same image that others usually see.

Figure 3:
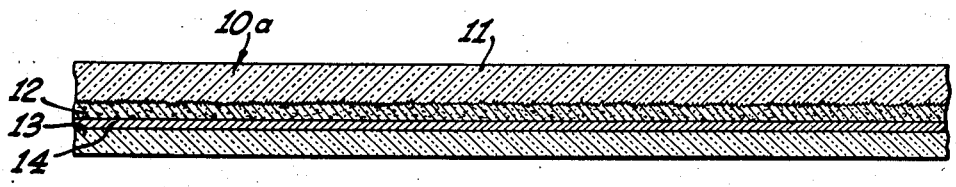
Figure 3 is a similar cross-sectional view of a modified form of my improved mirror.

Description of Figure 3

In Figure 3 I have illustrated a modified form of my improved mirror, wherein I provide a single mirror having both diffusing and non-diffusing properties. Thus, one side of the mirror has the same diffusing properties as the preferred form I have previously described, while the other side or face of the mirror has the conventional mirror, with no diffusion. Such a combination mirror, in general, presents a very excellent method of comparing my improved mirror with the conventional mirror.

It will be remembered that the preferred form of mirror, shown in Figure 2, has the reflecting layer 14 on the back of the inner transparent layer 13. This is done because the mirror or reflecting layer 14 is a physically delicate layer, and the transparent support 13 acts as a mechanical protection during the process of manufacture. However, where a double mirror is desired, the resulting convenience of the form shown in Figure 3 justifies the extra care which must be taken during manufacture.

As illustrated in that figure, a mirror 10a is provided with a forward transparent layer 11 having its rear surface roughened by sandblasting or some other suitable process. A second or rearward transparent layer 14, preferably of glass, is provided with a reflecting layer 13 as in the previously described form, but it will be noted that this reflecting layer, instead of being on the rear surface of the rearward transparent layer 13, is instead placed on the forward surface of this layer. Consequently, in the modified form, the reflecting layer 13 is placed between the forward and rearward transparent layers 11 and 14, instead of having both of the transparent layers on one side of the reflecting surface, as in the preferred form. The cement 12 has an index of refraction differing slightly from that of the outer transparent layer 11, and thus the same diffusing effect is produced when viewing a reflected image through the transparent layer 11 as is found in the preferred form. However, when a reflected image is viewed through the rear transparent layer 14, no diffusion occurs, and the mirror acts in the same manner as the conventional mirror. Consequently, by using my modified form of mirror 10a, a person may determine the general effect of his appearance by observing himself through the forward transparent layer 11, and may observe the minute details that are usually seen only upon close scrutiny by looking at his reflection through the rear transparent layer 14.

As suggested, the modified form of mirror has the disadvantage that its manufacture is somewhat more difficult, and consequently, its cost will normally be somewhat greater than that of the preferred type illustrated in Figure 2. The versatility of the modified form, however, will often warrant its greater cost, and hence both forms of mirrors are commercially practical and very desirable.

It will be realized that if so desired, either or both of the transparent layers 11 and 13 may be tinted to give the mirror a generally colored appearance, and it is likewise possible to incorporate a pigment of suitable type in the cement 12 so that a generally similar result is obtained. These and other modifications will be apparent to those skilled in the art, and are within the scope of my invention as herein defined. Consequently, I do not wish to be restricted to the particular form or arrangement of parts herein described and shown, except as limited by my claims.

I claim:

1. A mirror which includes: a stiff, transparent layer having a substantially plane surface and a slightly roughened opposite surface producing a diffusion materially greater than that desired; a reflecting layer rearwardly of said transparent layer and visible therethrough; and transparent refracting means having an index of refraction differing slightly from that of said transparent layer, between the roughened surface of the latter and said reflecting layer to reduce the diffusion of light passing through said transparent layer and said refracting means, thereby providing a softened reflected image retaining all but the finest details.

2. A mirror which includes: a stiff, transparent layer having a substantially plane forward surface and a slightly roughened rear surface, producing a diffusion of transmitted light materially greater than that desired; a reflecting layer rearwardly of said transparent layer and visible therethrough; and a layer of transparent cement between said transparent layer and said reflecting layer, said cement adhering to said rear surface of said transparent layer, with a roughened forward surface complemental to said rear surface of said transparent layer, and with a substantially plane rear surface, said cement having an index of refraction differing slightly from that of said transparent layer and thereby acting to reduce the light diffusion produced by said transparent layer, whereby light passing through said transparent layer and said cement is diffused slightly in its passage therethrough, said mirror thereby forming a slightly softened image retaining all but the finest details.

3. A mirror which includes: a transparent front layer having a substantially plane forward surface and a slightly roughened rear surface that diffuses transmitted light to an extent greater than desired; a second transparent layer, rearwardly of said front layer, having substantially plane forward and rear surfaces; a layer of transparent cement between the roughened rear surface of said front layer and the front surface of said second layer, said cement having an index of refraction that differs slightly from that of said front layer and thereby acting to reduce the light diffusion produced by said front layer, whereby light passing through said front layer and said cement is diffused slightly in said passage; and a reflecting layer on one of said surfaces of said second layer, acting to reflect a slightly softened image through said front layer, said image retaining all but the finest details.

4. A mirror as described in claim 3 in which said reflecting layer is on the rear surface of said second transparent layer, and said cement acts as a bond between the forward surface of said second layer and the rear surface of said front layer.

5. A mirror as described in claim 3 in which said reflecting layer is on the forward surface of said second layer, and said cement acts as a bond between said reflecting layer and the rear surface of said front layer.

6. A mirror which includes: a stiff, substantially colorless, transparent element having a substantially plane forward surface and a generally parallel rear surface that is roughened to an extent producing a diffusion of light transmitted through said element, said diffusion being greater than that desired in the finished mirror; a substantially plane reflecting layer capable of specular reflection rearwardly of said element and visible therethrough; and a layer of transparent cement between said element and said reflecting layer, adhering to said roughened rear surface of said element, and having an index of refraction differing slightly from that of said element and thereby acting to reduce the diffusion of light passing therethrough, whereby light passing through said element to said reflecting layer is diffused slightly before reaching said reflecting layer, and is then again diffused slightly in passing from said reflecting layer, through said element, whereby a mirror is produced that reflects a slightly softened image retaining all but the finest details.

7. The method of making a diffusing mirror of the class having a forward transparent layer and a rear layer carrying a substantially plane reflecting layer, which includes the steps of: roughening the rear surface of said forward transparent layer, said roughening being such as to cause the diffusion of light passing through said forward layer, said diffusion being greater than that desired in the finished mirror; and cementing said rear surface of said forward layer to said rear layer with a transparent cement having an index of refraction differing slightly from that of said forward layer, said cement completely coating said roughened rear surface and acting therewith to reduce the diffusion of light passing through said forward layer and said cement, whereby the degree of said diffusion may be reduced to any desired value, to and including zero diffusion.

WILLIAM H. HARRISON.

REFERENCES CITED

The following references are of record in the file of this patent:

UNITED STATES PATENTS

| Number | Name | Date |
|---|---|---|
| 1,653,040 | Drake | Dec. 20, 1927 |
| 1,698,307 | La Hodny | Jan. 8, 1929 |
| 1,744,316 | La Hodny | Jan. 21, 1930 |
| 1,747,425 | Cawley | Feb. 18, 1930 |
| 1,887,144 | Wilczynski | Nov. 8, 1932 |
| 1,960,514 | Ross | May 29, 1934 |
| 1,983,626 | Lytle | Dec. 11, 1934 |
| 2,122,178 | Land | June 28, 1938 |